United States Patent
Cohen et al.

[11] Patent Number: 6,142,637
[45] Date of Patent: Nov. 7, 2000

[54] NIGHT VISION GOGGLES COMPATIBLE WITH FULL COLOR DISPLAY

[75] Inventors: Richard Lawrence Cohen, Matawan; Craig Roy Scoughton, Sussex, both of N.J.

[73] Assignee: Allied Corporation, Morristown, N.J.

[21] Appl. No.: 06/786,268

[22] Filed: Oct. 10, 1985

[51] Int. Cl.[7] .............................. G02B 27/00; G08B 5/00; H01J 40/14

[52] U.S. Cl. ................................. 359/601; 250/214 LA; 359/229; 340/815.41; 340/945

[58] Field of Search ............................ 350/399; 340/757, 340/702, 815.41, 945; 358/161; 250/213 R, 213 VT, 213 A, 214 LA; 359/229, 601

[56] References Cited

U.S. PATENT DOCUMENTS

| | | | |
|---|---|---|---|
| D. 253,177 | 10/1979 | Litman | 250/213 VT X |
| 2,308,704 | 1/1943 | MacNeil | 350/399 X |
| 2,540,943 | 2/1951 | Hales . | |
| 2,955,231 | 10/1960 | Aiker . | |
| 3,245,315 | 4/1966 | Marks et al. | 350/399 X |
| 3,373,506 | 3/1968 | Davidoff . | |
| 3,449,583 | 6/1969 | Eden | 250/213 R |
| 3,479,454 | 11/1969 | Wolff . | |
| 3,517,122 | 6/1970 | Owen . | |
| 3,812,526 | 5/1974 | Tan | 250/213 VT X |
| 3,840,731 | 10/1974 | Säufferer | 350/399 X |
| 3,955,190 | 5/1976 | Teraishi | 340/757 |
| 4,170,772 | 10/1979 | Bly . | |
| 4,201,450 | 5/1980 | Trapani | 350/399 X |
| 4,374,325 | 2/1983 | Howorth | 250/213 VT |
| 4,463,252 | 7/1984 | Brennan et al. | 250/213 VT |
| 4,473,277 | 9/1984 | Brown | 350/399 |
| 4,488,786 | 12/1984 | Caramel | 250/399 X |
| 4,495,520 | 1/1985 | Kravitz et al. . | |

*Primary Examiner*—Stephen C. Buczinski
*Attorney, Agent, or Firm*—Loria B. Yeadon

[57] ABSTRACT

A night vision aid such as night vision goggles (13) is made compatable with a local full color display (17) by blocking local display light from being received by the night vision aid (13). A circular polarizer (23) of one left/right sense is positioned so as to filter the local display. A circular polarizer (25) of an opposite sense is placed before a light input of the night vision aid (13), thereby preventing the polarized light from the display (17) from entering the night vision aid (13). Advantageously, the circular polarizer (23) on the display has minimal effect on linear polarizers which may be used with eyeglasses.

14 Claims, 2 Drawing Sheets

NIGHT VISION GOGGLES COMPATIBLE WITH FULL COLOR DISPLAY

BACKGROUND OF THE INVENTION

This invention relates to electronic passive night vision aids and to a system for operating such night vision aids in conjunction with a local display such as a cockpit display. More particularly, the invention relates to an electronic night vision aid which amplifies light and may be used with a local display. A typical local display used with this invention is a head down display (HDD) used to provide instrumentation and other data to the viewer. It is intended that the local display may be viewed either with or without the night vision aid in use.

Passive night vision aids such as ambient night vision (ANVIS) goggles are becoming popular in the military aircraft cockpit setting. The increased popularity of such night vision goggles and other passive night vision aids creates unique problems with illumination of cockpit displays. These passive night vision aids operate by amplifying available light, particularly in the longer wavelengths of visible light. In the upper infrared ranges, illumination from cockpit display sources overwhelms sensor elements which are used in such night vision aids, and thereby interrupts the night vision aid for up to several minutes.

It is important that the display indicators remain illuminated, not only for the benefit of the crewmen who are not wearing night vision aids, but also because those using the goggles will typically view the instruments by looking under the goggles. In an attempt to alleviate this problem of cockpit displays overwhelming ANVIS devices, attempts have been made to filter the light from these display sources to restrict illumination to wavelengths not normally received by the night vision goggles. Filtration of the objectionable light must be very efficient because small amounts of light within the active frequency range of the night vision aid will overwhelm the aid. This becomes difficult due to the close proximity to the night vision aid of illuminated indicators.

Conventional passive night vision aids are sensitive to light having wavelengths of 580 nM or longer. This means that illumination of displays at shorter wavelengths (frequencies above the frequency range of the passive night vision aids) will not substantially interfere with the night vision aids and will facilitate the use of such night vision aids. The selective filtration of light according to wavelength generally prevents the use of full color displays. This is because frequencies at the lower end of the visible spectrum overlap with those frequencies which are received by the night vision goggles.

It is accordingly desired that a night vision aid such as ambient night vision (ANVIS) goggles be operable while a full color display is presented in the vicinity of the goggles. In particular, it is desired to operate ANVIS goggles in a cockpit or similar environment in which a full color display is illuminated. It is therefore desired to prevent light which originates at the full color display from overwhelming the night vision aid.

SUMMARY OF THE INVENTION

In accordance with the present invention, an ambient night vision (ANVIS) aid, such as an ANVIS goggles set, is provided with a polarizing filter. A second polarizing filter blocking light in an opposite sense from the first polarizing filter is placed over displays which may otherwise present light which would interfere with the ANVIS.

Advantages include increased flexibility in use of ANVIS devices and ability to operate full color displays when ANVIS devices are being used.

DETAILED DESCRIPTION OF THE PREFERRED EMBODIMENTS

Figure 1:
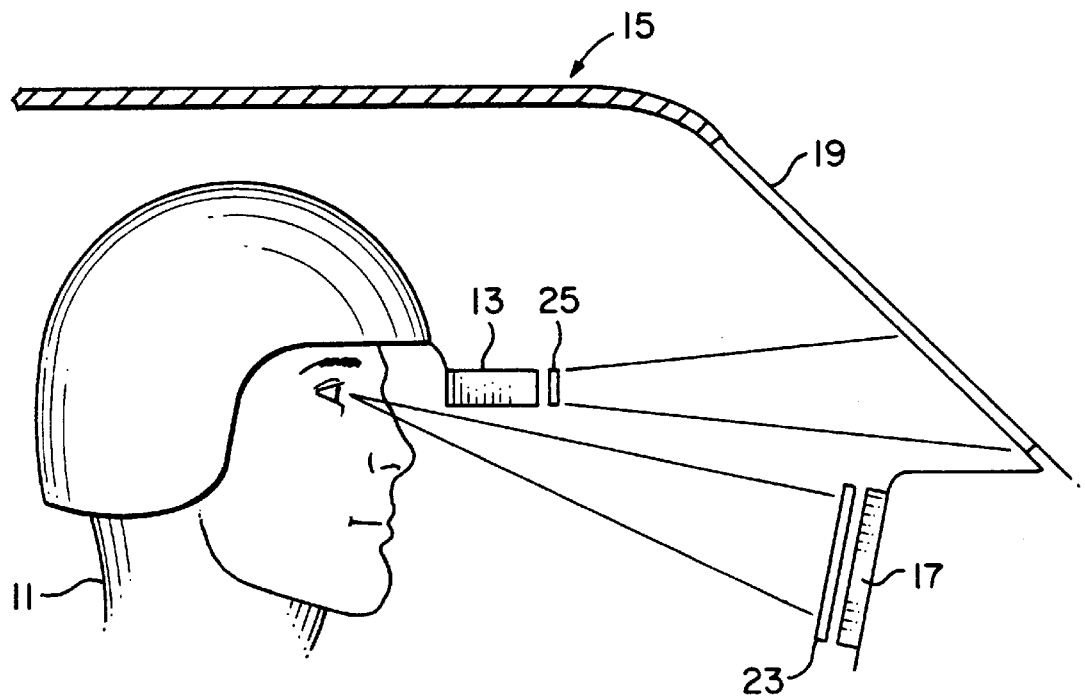
FIG. 1 shows an arrangement by which offending light is blocked from entering a night vision goggles device by the use of filters on the night vision goggles device and a head down display.

FIG. 1 shows a viewer such as a crewmember 11 of an aircraft or other vehicle. The crewmember 11 is provided with a night vision aid device such as an ambient night vision (ANVIS) goggles set within an aircraft cockpit 15. A local display 17 which is preferably a head down display (HDD) is also viewable by the crewmember 11, although the crewmember 11 would tend to avoid looking through the ANVIS 13 while viewing the local display 17. Thus, the ANVIS 13 is intended for use when viewing objects outside of the cockpit 15 through a wideshield 19 of the cockpit, whereas the local display 17 is intended to be viewable without the aid of the ANVIS 13.

While the preferred embodiment is described in conjunction with a specific example of a crewmember 11 in an aircraft cockpit 15, it is understood that the present invention can be used by other viewers in association with environments other than an aircraft cockpit 15. Furthermore, it is anticipated that in many situations, including an aircraft, multiple crew members may be present and the ANVIS 13 may be utilized by a different members.

The cockpit has several local displays such as display 17 which are illuminated so to be clearly visible without the use of the ANVIS 13. While nighttime illumination of the display 17 is likely to be reduced under the lighting conditions in which the ANVIS 13 is used, the localized display 17 may still overwhelm the ANVIS 13. This can occur as a result of stray light from the display 17 such as reflected light entering the ANVIS 13, or from the ANVIS 13 momentarily aligning with the display 17. If this happens, the ANVIS 13 may go to full illumination, a situation which is not only unpleasant for the crewmember 11, but which also temporarily impairs his vision, particularly with respect to dimly lit objects. A further effect of the ANVIS 13 being overwhelmed is that photooptical circuit elements within the ANVIS 13 tend to maintain some of the effects of bright illumination for short periods of time. This phenomenon is akin to "blooming" which also occurs when portions of photoelectric elements are brightly illuminated.

In order to avoid the ANVIS 13 being overwhelmed by light from the display 17, it may be necessary to filter light from the display 17 before that light reaches the ANVIS 13. If the local display 17 is a full color display, it is necessary to use techniques other than color selection to filter light entering the ANVIS 13.

Located in front of the local display 17 is a polarizing filter 23, sometimes referred to as a polarizer. A polarizer of an opposite sense 25 is placed in front of the ANVIS 13 in a way such that light entering the ANVIS 13 must pass through the opposite sense polarizer 25. As a consequence of the two polarizers 23, 25 being of opposite senses from each other, light transmitted from the local display 17 is blocked from entering the ANVIS 13.

In a preferred embodiment, the polarizers 23, 25 are circular polarizers, with one of the polarizers 23, 25 being a right hand polarizer, while the other polarizer 25, 23 is a left hand polarizer. While there is no preference for which polarizer 23 or 25 is selected as having the left hand polarization, it may be that disparate devices such as aircraft exterior lights may use polarizers of a certain sense, thereby making it advantageous to select the directions of polarization of the polarizers 23, 25 accordingly. It is also possible to provide linear polarizer filters as polarizers 23 and 25, although if the crewmember 11 tilts his head and the ANVIS 13 sideways, the combined effects of filters 23 and 25 are significantly diminished.

The conditions under which the ANVIS 13 is used, as stated previously, are such that maximum brightness or illumination of the local display 17 is not required. For this reason, filter 23 has little effect on the quality of the image provided by the local display 17. It is, of course, recognized that polarizer 25 has some effect on the image provided by the ANVIS 13. It is anticipated that the use of polarizer 25 has other beneficial effects in viewing the outside world, for example, by reducing glare from the windshield 19.

Figure 2:
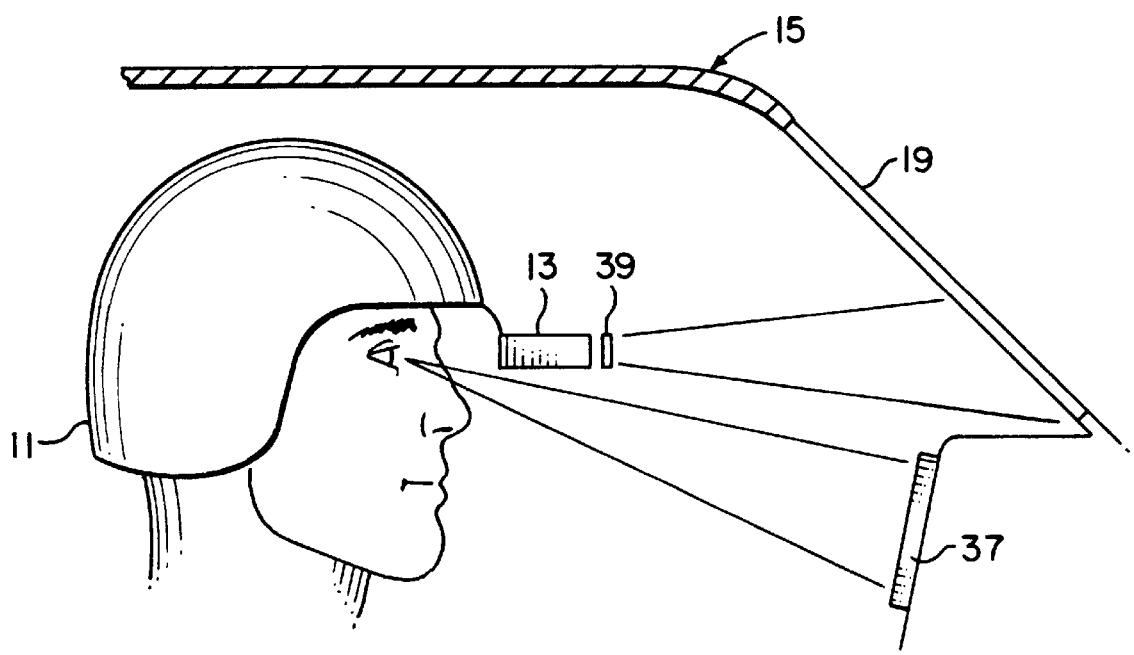
FIG. 2 shows an arrangement by which offending light is blocked from entering a night vision goggles device by the u of an electronic shutter.

FIG. 2 shows an arrangement by which light originated from a local display 37 is blocked by a light blocking device 39. Preferably, the light blocking device 39 is a liquid crystal filter, in which a liquid nematic crystal substrate is aligned by electrical charges. The alignment of the liquid substance crystal causes light to be blocked or unblocked from passage through the liquid crystal substance. This enables the liquid crystal shutter to rapidly block and unblock light admitted to the ANVIS 13. If the local display 37 is caused to have a blanking time, the blanking time can be synchronized with the operation of the liquid crystal shutter 39 in such a way that when the liquid crystal shutter 39 admits light, the local display 37 is blanked. In the case of the display 37 being a full color cathode ray tube display, the display 37 can be blanked in order to display a complete frame when the shutter 39 is closed and not illuminate during the blanking period. During the blanking period, the liquid crystal shutter 39 is caused to admit light.

In lieu of a liquid crystal shutter, shutter 39 may use a different design. For example, a PLZT shutter may be used as shutter 39 in order to provide a fast response time.

The technique of using three primary display colors to generate a full color image on a cathode ray tube allows a much greater time period for admitting light to the ANVIS 13 while still providing a high quality image to a local display 37 which uses a cathode ray tube. If the ANVIS 13 is sensitive only to colors at lower wavelengths (red), then only the red color from the local display 37 need be blanked. This allows the other primary colors generated on the local display 37 to be displayed in a normal manner.

If the different colors displayed by the local display 37 are sequentially scanned, then any one color would be blanked during the time when a. frame of the other colors are being scanned. If three primary colors are used on the local display 37, then the liquid crystal shutter 39 need only be closed during approximately one third of the time of operation. In cases where the colors on the local display are simultaneously scanned, it is still possible to blank only the one offending color during a portion of the time of display. Since the need for light intensity of the display 37 during the use of the ANVIS 13 is low, it is anticipated that the non-offending colors will be reduced in intensity. The offending color may then be intermittantly blanked and, when not blanked, transmitted at a high enough intensity to compensate for the blanking. This reduces flicker which would occur on the local display 37 by causing such flicker to be predominate in only one color. Since the other colors are being transmitted at a normal rate, the normal scanning characteristics of images in the non-offending colors is retained, while the crewmember 11 is able to perceive a full color image on the local display 37. This allows the crewmember 11 to perceive spatial relationships in the image with reduced flicker.

Figure 3:
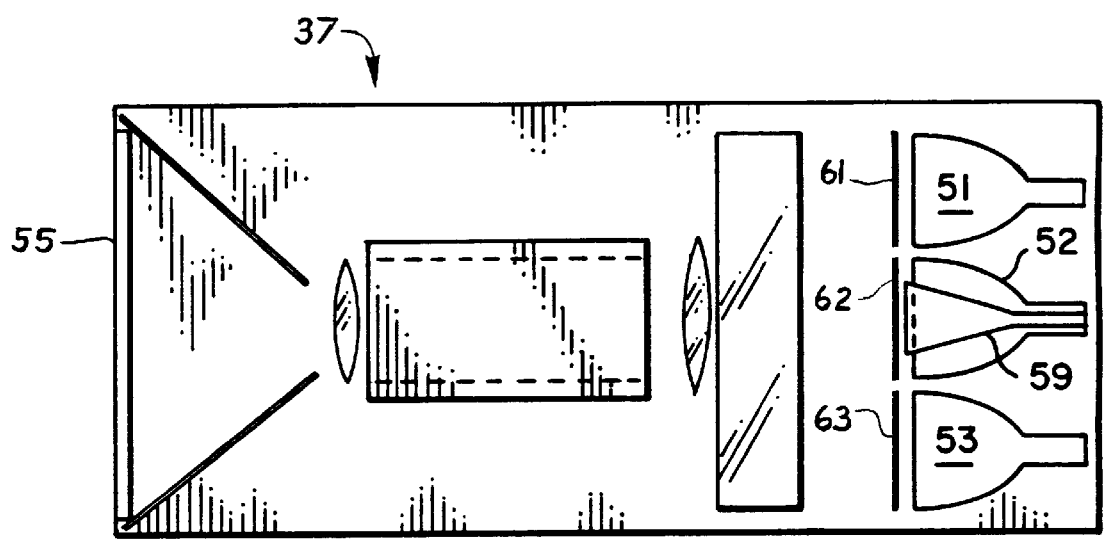
FIG. 3 shows an arrangement for selective color filtration for a three-tube CRT display in accordance with one embodiment of this invention.

FIG. 3 shows an arrangement in which three monochromatic cathode ray tubes (CRTs) 51, 52, 53 are used to provide a color display. Such a color display could be used as the local display 17 shown in FIG. 1 or the local display 37 shown in FIG. 2. Each CRT 51, 52, 53 provides a monochromatic image in one primary color for the full color display, which appears on a front screen 55 as a combined full color image. The image from CRTS, 51–53 can be supplemented with an image from an additional source such as CRT 59. The use of monochromatic CRTs 51–53 permits the outputs of the different CRTs 51, 52, 53 to be filtered in different manners. For example if CRT 51 projects an image in the red spectrum, a bandpass filter 61 may be used with CRT 51 so that only light within a narrow range of frequencies may be transmitted to the screen 55. The other CRTs 52 and 53 may be provided with high pass (or low pass should that become appropriate) filters 62,63 which block all objectionable light, including light within the range admitted by filter 61. If the output color of either of CRTs 52 and 53 is also close to light frequencies which would cause interference with the ANVIS 13, its filter 62 or 63 could also include a bandpass characteristic.

The use of high pass filter 62 also permits the display of an image from the additional CRT 59, although its output color may become restricted.

In the case of the local display 37 using separate cathode ray tubes 51–53 or other display transducers, it is possible to more easily filter offending colors from reaching the ANVIS 13. In this arrangement, the display unit of the offending color is filtered with a narrow band bandpass filter so that light transmitted by the display unit is only within a very narrow color band. In the case of CRT displays, the narrow color band may be defined as the band at which most light is transmitted by a phosphor coating on the CRT, typically a five to twenty nanometer band. Light blocking device 39 on the ANVIS 13 may therefore be a notch filter for blocking light corresponding the narrow color band. This provides a minimum of filteration of total light input to the ANVIS 13, thereby permitting the ANVIS 13 to operate near maximum efficiency. Likewise, light from the local display 37 is also transmitted at near maximum efficiency. The most offending color (usually red) can further be blanked as described above.

Referring to FIG. 1, in cockpit arrangements where the ANVIS 13 is as a practical matter restricted in its physical position, a local display 17 can be used to augment filtration at polarizer 23. Such directional filtration would also be effective with other types of filtration.

While specific configurations of the local display 13 or 37 have been described, it is understood that the present invention can be applied to a wide variety of display and vision aid devices. For example, the offending light which is blocked from admission to the ANVIS 13 may be interior ambient cockpit lighting, rather than the illumination of the display. For these reasons, the present invention should be read as limited only by the claims.

What is claimed is:

1. Display system for use in association with a light amplifying passive night vision aid and a local display including a local source of light, wherein local source light is blocked from interfering with the night vision aid, characterized by:

a) a first optical filter positioned with respect to the local display so as to filter light which passes from the local display, the first filter having a filtering characteristic which blocks light of a first predetermined sense and which passes light of a second predetermined sense; and b) a second optical filter, positioned with respect to the night vision aid so as to filter light entering a light entering a light input of the night vision aid, the second filter blocking light of the second predetermined sense and admitting light of the first predetermined sense, wherein, light originating from the local display is substantially blocked by the combination of the first and second filters from being admitted to the night vision aid.

2. Display system as described in claim 1, further characterized by:

the first and second filters including polarizing filters.

3. Display system as described in claim 2, further characterized by:

the first and second filters including circular polarizers.

4. Display system as described in claim 1, further characterized by:

the first filter including a bandpass filter which admits light within a specified range; and the second filter having a characteristic of blocking light within said specified range.

5. Display system as described in claim 2, further characterized by:

the local display providing potentially interfering light within a specified range, said specified range being narrower than a range of sensitivity of the night vision aid; and the second optical filter having a characteristic of blocking light within said specified range.

6. Display system as described in claim 4, further characterized by:

the first and second filters including polarizing filters.

7. Display system as described in claim 6, further characterized by:

the first and second filters including circular polarizers.

8. Display system for use in association with passive amplifying ambient night vision goggles and a local display including a local source of light, wherein local source light is blocked from interfering with the night vision goggles characterized by:

a) a first optical filter positioned with respect to the local display so as to filter light which passes from the local display, the first filter having a filtering characteristic which blocks light of a first predetermined sense and which passes light of a second predetermined sense; and b) a second optical filter, positioned with respect to the night vision goggles so as to filter light entering a light input of the night vision goggles, the second filter blocking light of the second predetermined sense and admitting light of the first predetermined sense, wherein, light originating from the local display is substantially blocked by the combination of the first and second filters from being admitted to the night vision goggles.

9. Display system as described in claim 8, further characterized by:

the first and second filters including polarizing filters.

10. Display system as described in claim 9, further characterized by:

the first and second filters including circular polarizers.

11. Display system as described in claim 8, further characterized by:

the first filter including a bandpass filter which admits light within a specified range; and the second filter having a characteristic of blocking light within said specified range.

12. Display system as described in claim 9, further characterized by:

the local display providing potentially interfering light within a specified range, said specified range being narrower than a range of sensitivity of the night vision goggles; and the second optical filter having a characteristic of blocking light within said specified range.

13. Display system as described in claim 11, further characterized by:

the first and second filters including polarizing filters.

14. Display system as described in claim 13, further characterized by:

the first and second filters including circular polarizers.

* * * * *